United States Patent
Chenu et al.

(10) Patent No.: US 11,959,562 B1
(45) Date of Patent: Apr. 16, 2024

(54) VALVE PLUG

(71) Applicant: Dresser, LLC, Houston, TX (US)

(72) Inventors: Romain Chenu, Condé-sur-Noireau (FR); Valentin Mercier, Flers (FR)

(73) Assignee: Dresser, LLC, Houston, TX (US)

( * ) Notice: Subject to any disclaimer, the term of this patent is extended or adjusted under 35 U.S.C. 154(b) by 0 days.

(21) Appl. No.: 18/153,811

(22) Filed: Jan. 12, 2023

(51) Int. Cl.
*F16K 5/06* (2006.01)

(52) U.S. Cl.
CPC .......... *F16K 5/0605* (2013.01); *F16K 5/0652* (2013.01); *F16K 5/0657* (2013.01)

(58) Field of Classification Search
CPC ..... F16K 5/0605; F16K 5/0656; F16K 5/0647
See application file for complete search history.

(56) References Cited

U.S. PATENT DOCUMENTS

| | | | |
|---|---|---|---|
| 3,623,696 A * | 11/1971 | Baumann | F16K 1/224 251/298 |
| 5,218,984 A * | 6/1993 | Allen | F16K 5/0605 137/1 |
| 5,618,026 A * | 4/1997 | Geyer | F16K 1/2057 251/363 |
| 7,059,585 B2 * | 6/2006 | Dalluge | F16K 5/20 251/315.16 |
| 7,770,867 B2 | 8/2010 | Libke et al. | |
| 9,010,109 B2 * | 4/2015 | Marques | F01D 17/105 251/298 |
| 9,441,740 B2 | 9/2016 | Kennedy | |
| 9,951,876 B2 | 4/2018 | Asanuma et al. | |
| 10,495,234 B2 | 12/2019 | Fagerlund et al. | |
| 10,808,850 B2 | 10/2020 | Abouelleil et al. | |
| 2019/0136989 A1 | 5/2019 | Suzuki et al. | |

FOREIGN PATENT DOCUMENTS

JP 6620680 B2 12/2019

* cited by examiner

*Primary Examiner* — Michael R Reid
(74) *Attorney, Agent, or Firm* — Mintz, Levin, Cohn, Ferris, Glovsky and Popeo, P.C.

(57) ABSTRACT

Systems and devices for controlling flow of a fluid through a valve are provided. A valve plug can include a hub. The hub can include a hub body having a longitudinal axis extending through the hub body and a bore extending along the longitudinal axis extending through the hub body. The hub can also include at least one elliptically-shaped protrusion integrally formed within the hub body. The valve plug can also include a dome having a first surface, a second surface opposite the first surface, and at least one side wall extending between the first surface and the second surface around a circumference of the dome. The valve plug can also include at least one arm extending between the hub body and the second surface of the dome. The valve plug can be coupled to a drive shaft and a controller in a variety of non-limiting valve types.

20 Claims, 10 Drawing Sheets

VALVE PLUG

BACKGROUND

Valves are mechanical devices which are commonly used on process piping or pressure vessels, such as in power generation, refining or oil and gas production environments, for controlling flow of a medium or fluid through the valve. Valves can include a valve plug configured to engage with an inlet or an outlet of the valve to control the flow of the fluid through the valve.

SUMMARY

In general, apparatuses and systems including a valve plug for controlling a fluid flow through a valve are provided.

In one aspect, a valve plug is provided. In an embodiment, the valve plug can include a hub. The hub can include a hub body having a longitudinal axis extending through the hub body and a bore extending along the longitudinal axis extending through the hub body. The hub can also include at least one elliptically-shaped protrusion integrally formed within the hub body. The valve plug can also include a dome having a first surface, a second surface opposite the first surface, and at least one side wall extending between the first surface and the second surface around a circumference of the dome. The valve plug can also include at least one arm extending between the hub body and the second surface of the dome.

In some embodiments, the hub can include two arms extending between the hub body and the second surface of the dome. In some embodiments, the bore can include a plurality of grooves configured to receive a splined drive shaft. In some embodiments, the at least one elliptically-shaped protrusion can extend radially away from the longitudinal axis. In some embodiments, the at least one elliptically-shaped protrusion can be positioned at an angle relative to a horizontal plane intersecting the longitudinal axis of the hub body. In some embodiments, the hub body can include a substantially flat portion at a circumferential location of hub body bisected by the horizontal plane. In some embodiments, the hub can include a first elliptically-shaped protrusion and a second elliptically-shaped protrusion opposite the first elliptically-shaped protrusion.

In some embodiments, the at least one side wall can include a first side wall having a first height, a second side wall having a second height different than the first height of the first side wall, and a tapered side wall between the first side wall and the second side wall. In some embodiments, the at least one side wall can include a third side wall having a third height and a fourth sidewall extending at an angle from the second surface of the dome. In some embodiments, the dome can include a material atop the first surface configured to provide wear resistance. In some embodiments, the material can include a cobalt alloy.

In some embodiments, the valve plug can be included in a rotary valve. In some embodiments, the rotary valve can be operable to control flow of a fluid through the rotary valve in a first direction and in a second direction opposite to the first direction. In some embodiments, a cross-sectional shape of the hub can be configured to increase a flow coefficient of the rotary valve and to maintain pressure of the fluid adjacent to the hub body. In some embodiments, the first surface can have a substantially convex shape and the second surface can be substantially flat. In some embodiments, the at least one arm has a substantially rectangular-shaped cross section.

In another aspect, a system is provided. The system can include a controller including an actuator coupled to a drive shaft. The system can also include a valve coupled to the drive shaft. The valve can include a first opening, a second opening opposite the first opening, and a valve plug positioned between the first opening and the second opening. The valve plug can include a hub coupled to the drive shaft. The hub can include a hub body having a longitudinal axis extending through the hub body and a bore extending along the longitudinal axis through the hub body. The hub can also include at least one elliptically-shaped protrusion integrally formed with the hub body. The valve plug can also include a dome having a first surface, a second surface opposite the first surface, and at least one side wall extending between the first surface and the second surface around a circumference of the dome. The valve plug can also include at least one arm extending between the hub body and the second surface of the dome.

In some embodiments, the valve is operable to control flow of a fluid through the valve in a first direction and in a second direction opposite to the first direction. In some embodiments, the first opening or the second opening include a valve seat configured to engage with the at least one side wall of the dome and cause the valve to be fluidically sealed. In some embodiments, the valve seat includes a wear resistant material.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Valves can include a valve plug configured to move between opening and closing positions so as to control a flow of a fluid passing from an inlet of the valve to an outlet of the valve. The shape of the valve plug can influence the flow of the fluid as well as the operational characteristics of the valve. Existing valve plugs can include components that have angular or planar shapes or surfaces which can adversely affect the flow coefficient (Cv) and capacity of the valve. As a result, accurately controlling a valve by making opening or closing adjustments can be limited as the inherent shape of existing valve plugs can hinder the precision needed for improved valve control. The inability to precisely control valve operations can significantly affect industrial operations that require specific valve settings and can cause operating expenses to increase due to down time and/or specialized equipment needed to retrofit valves as well as additional or modified control systems necessary to provide the desired valve control.

The valve plug and valve systems described herein are improved to provide greater valve control, increased valve capacity and improved flow coefficients in opening and closing configurations. The elliptically-shaped valve plug hub and convex dome shape can distribute fluid flow more uniformly through the valve cavity to reduce turbulence of the fluid and to improve control of the valve when being opened or closed. As a result, the valve and valve plug can be used in a larger number of applications requiring precision valve control that cannot be met by existing valve plug designs.

Figure 1:
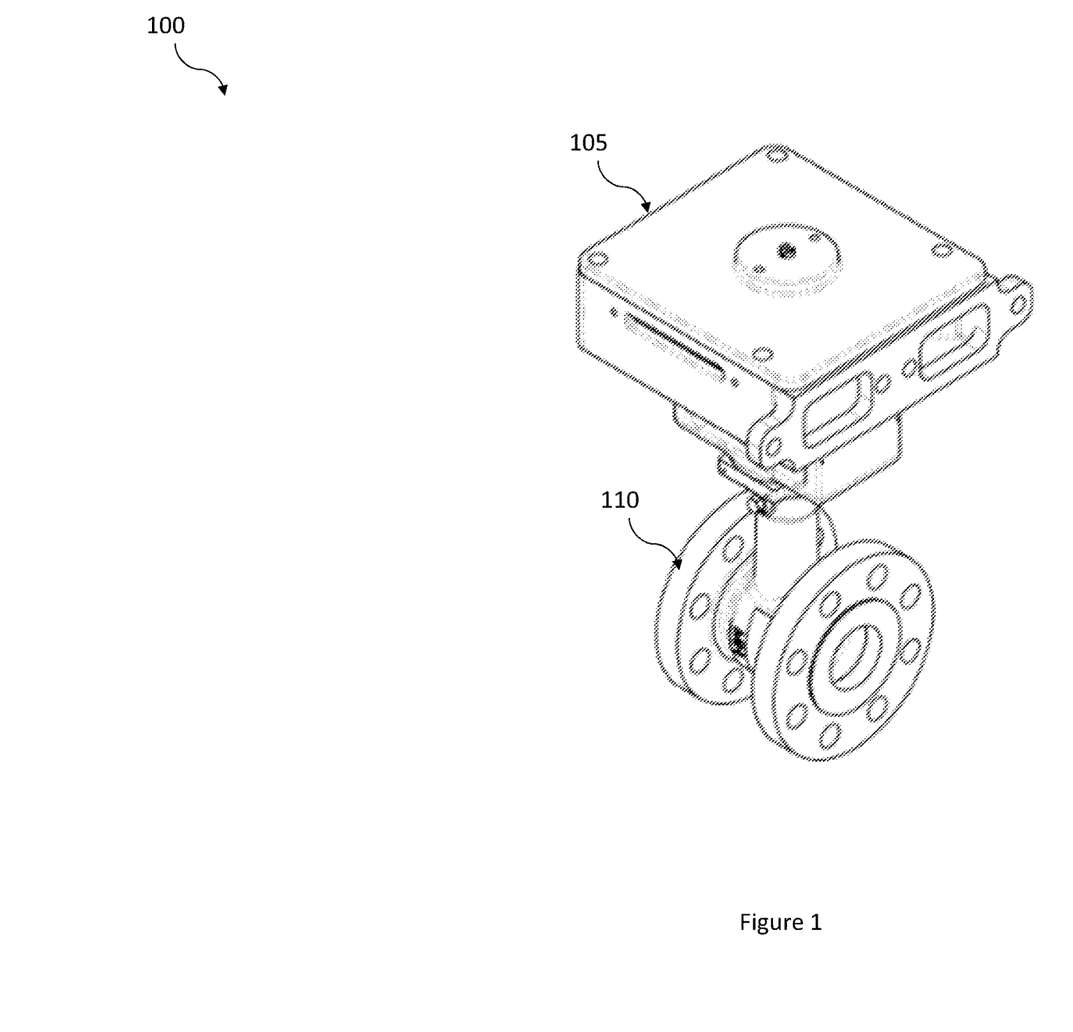
FIG. 1 is a perspective view of one exemplary embodiment of a system including a valve plug according subject matter described herein.
Figure 2:
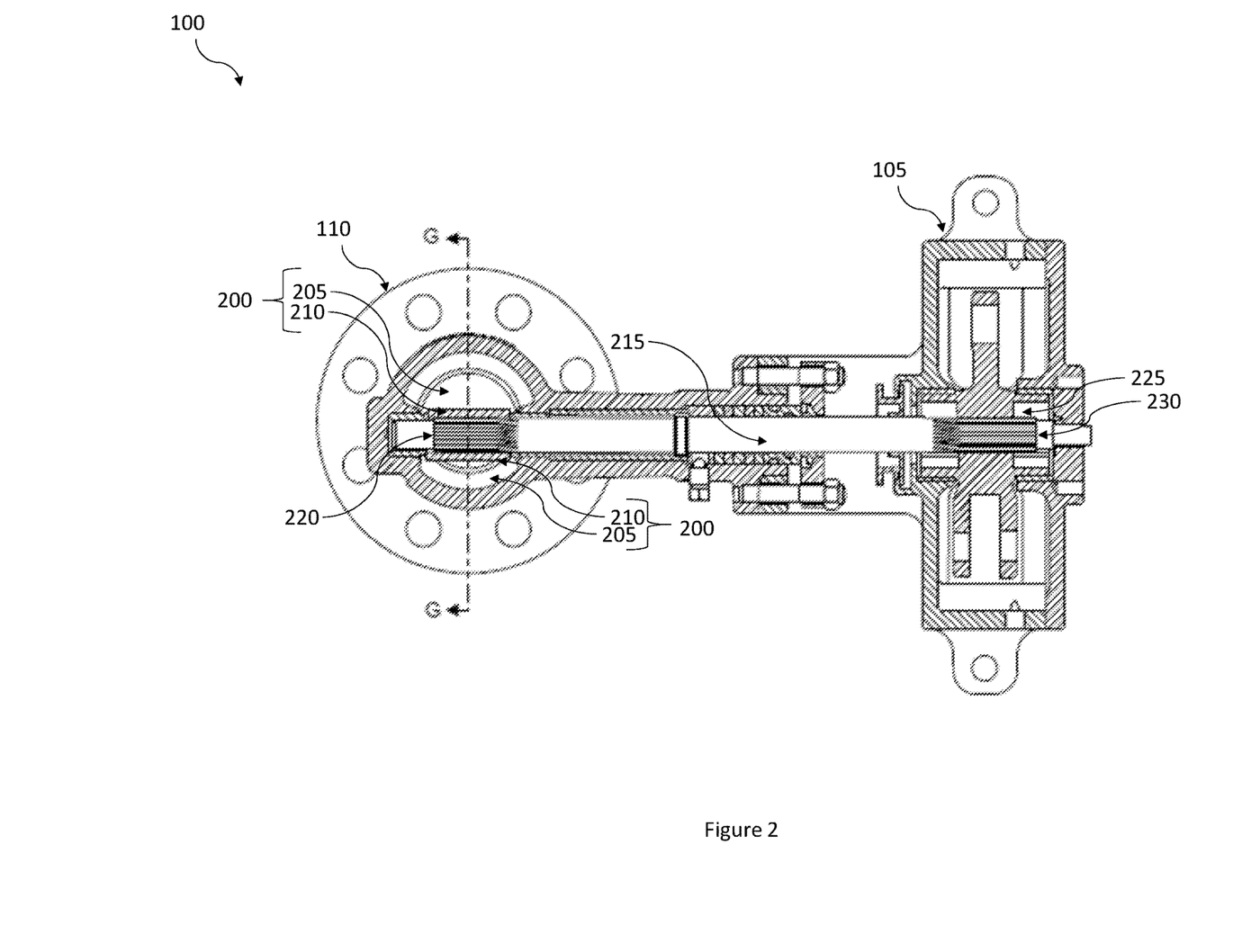
FIG. 2 is a cross-sectional view of the system of FIG. 1.

The improved valve system 100 described herein can include a controller 105 coupled to a valve 110 as shown in FIG. 1. The controller 105 can be, for example, an electromechanical device, computer or programmable logic controller (PLC), which can function autonomously or be controlled remotely, and is configured to actuate an actuator in response to control signals. The controller 105 can be mechanically coupled to the valve 110 and can cause the valve 110 to open or close in response to the control signals. In some embodiments, the valve 110 can be a rotary valve. As shown in the more detail in the cross-sectional view of FIG. 2, the system 100 can include the controller 105 including an actuator 225 coupled to a shaft 215, which can be further coupled to a valve plug 200 configured in the valve 110. The valve plug 200 can include a dome 205 and a hub 210. The hub 210 can be coupled to a drive shaft 215, which can include a plurality of splines 220 arranged at one or both ends of the drive shaft 215. The hub 210 can include a corresponding set of grooves arranged within a body of the hub 210 that can receive the splines 220 of the drive shaft. The actuator 225 can act on the splines 230 to cause the drive shaft 215 to rotate in a first direction or a second direction causing the valve plug 200 to rotate in a corresponding first direction (e.g., a direction opening the valve 110) or a second direction (e.g., a direction closing the valve 110).

Figure 3:
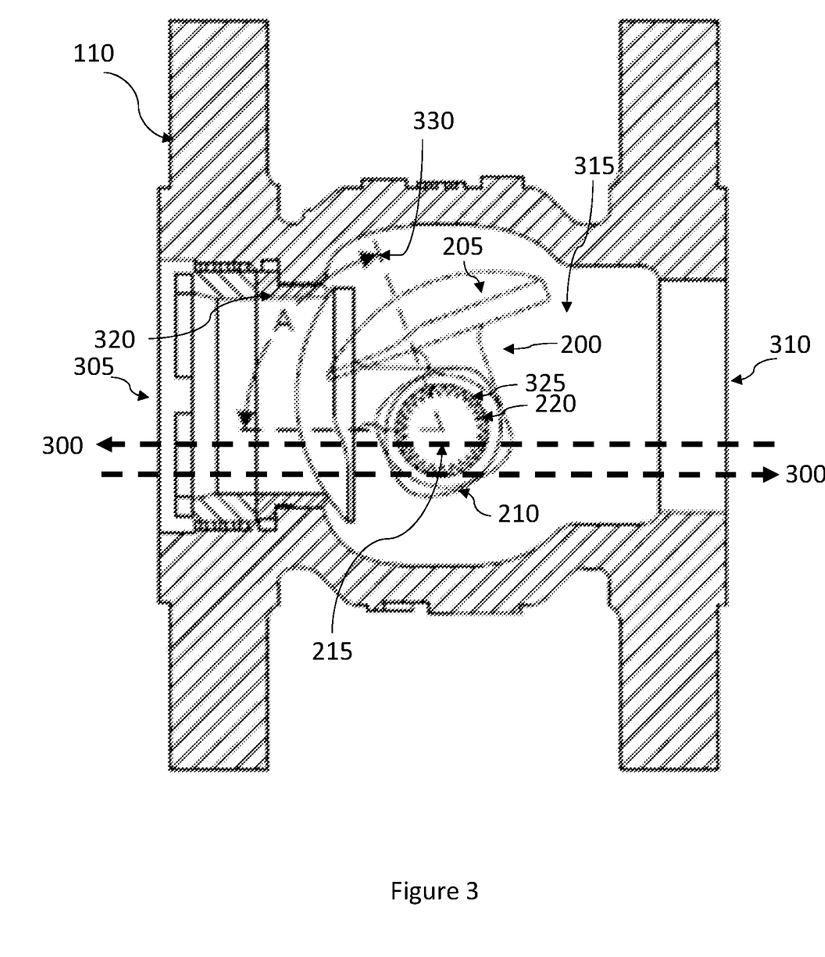
FIG. 3 is a cross-sectional side view of a valve including a valve plug of the system of FIG. 1.

As shown in FIG. 3, the valve 110 can be configured for bi-directional flow. For example, in one embodiment, the flow 300 can flow between opening 310 to opening 305 (e.g., opening 310 is an inlet and opening 305 is an outlet). In another embodiment, the valve can be configured such that flow 300' can flow between opening 305 to opening 310 (e.g., opening 305 is an inlet and opening 310 is an outlet). The valve plug 200 can be configured to operate in a valve 110 configured for flow 300 or 300'. As shown in FIG. 3, the valve 110 is configured such that fluid enters opening 305 and flows into the cavity 315 before exiting the valve 110 via opening 310 (e.g., along flow 300'). The valve plug 200 can be arranged within the cavity 315 such that the dome 205 can engage with a valve seat 320 positioned in the opening 305 when the valve plug 200 is translated to close the valve 110. In some embodiments, the valve seat 320 can include a wear-resistant coating to maintain a sealable connection with the dome 205 over repeated opening and closing of the valve 110. In some embodiments, the wear-resistant coating can include. For example, the wear-resistant coating can include a metal alloy. In some embodiments, the wear-resistant coating can be a cobalt-chromium alloy. In some embodiments, the wear-resistant material can include nickel or molybdenum as well as cobalt and/or chromium.

The valve plug 200 can include a plurality of grooves 325 arranged in a bore extending through the hub 210. The grooves 325 can interface with the splines 220 of the drive shaft 215 to create a mechanical coupling between the drive shaft 215 and the valve plug 200. Actuation of the drive shaft 215 can cause the valve plug 200 to travel along path A defined by range 330 to open or close the valve 110 (e.g., to open or close the opening 305 and flow 300'). The range 330 can be referred to as an opening angle or a rotation angle of the valve 110 (and thus the valve plug 200). In some embodiments, the range 330 of travel along path A can be between 0-1 degrees, 0-5 degrees, 0-10 degrees, 0-20 degrees, 0-30 degrees, 0-40 degrees, 0-50 degrees, 0-60 degrees, 0-70 degrees, 0-80 degrees, or 0-90 degrees relative to a horizontal plane bisecting a central axis of the drive shaft 215. Smaller increments of travel within any of the aforementioned ranges of travel can also be envisioned without limit, such as 0.1 degree, 0.25 degrees, 0.5 degrees, 0.75 degrees, 1.0 degrees, 2.5 degrees, 5.0 degrees, or the like. The profile of the dome 205 and the hub 210 can advantageously provide improved flow capacity (e.g., improved flow coefficient Cv) and reduced turbulence of the flow through the valve 110 at one or more opening angles. In this way, the valve plug 200 can allow for more precise control during opening and closing operations.

Figure 4:
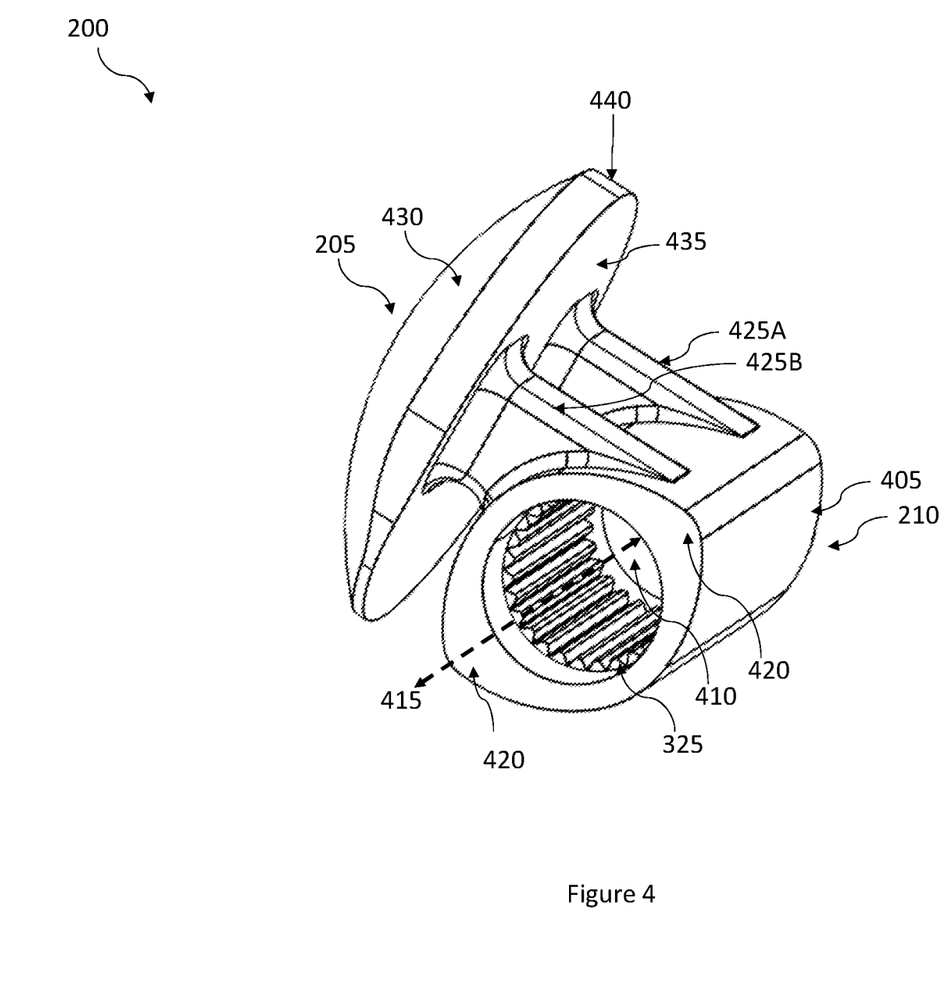
FIG. 4 is a perspective view of an exemplary embodiment of the valve plug of FIG. 2 according to subject matter described herein.

The valve plug 200 can include a number of flow conditioning features not found in existing valve plugs. For example, as shown in FIG. 4, the valve plug 200 can include a hub 210 formed from a hub body 405. The hub body 405 can include a bore 410 extending longitudinally through the hub body 405. The plurality of grooves 325 can be arranged on around a periphery of an inner surface of the hub body 405 and can define an outer diameter of the bore 410. The hub body 405 can include a longitudinal axis 415 extending through the bore 410 and thus the hub body 405.

The hub 210 can also include at least one elliptically-shaped protrusion 420. The protrusion(s) 420 can be wing-shaped so as to increase flow across the surface of the hub body 405 with minimal reduction in pressure losses around the hub 210. The protrusion(s) 420 can be integrally formed within and part of the hub body 405. The protrusion(s) 420 can be configured at a location on the outer surface of the hub body 405 that angled relative to a horizontal plane intersecting the longitudinal axis 415. In some embodiments, the protrusion(s) 420 can be located at a 60 degree angle relative to a horizontal plane intersecting the longitudinal axis 415, although a variety of other angles can be envisioned without limit. For example, the protrusion(s) 420 can be angled relative to the horizontal plane intersecting the longitudinal axis 115 at an angle that is between 0-5, 5-10, 10-15, 15-20, 20-25, 25-30, 30-35, 35-40, 40-45, 45-50-55, 55-60, 60-65, 65-70, 70-75, 75-80, 80-85, or 85-90 degrees relative to the horizontal plane intersecting the longitudinal axis 115. In some embodiments, the hub body 405 can include a single protrusion 420. In some embodiments, the hub body 405 can include two protrusions 420. The protrusions 420 can be configured on the hub body 405 to reduce fluid flow disturbance of the fluid flow 300/300' and to reduce friction of the fluid flow 300/300' across the surface of the hub body 405.

The dome 205 can be coupled to the hub body 405 by at least one arm 425, such as arms 425A and 425B. The arms 425 can extend radially away from the hub body 405 and can couple the dome 210 to the hub body 405. In some embodiments, the arm(s) 425 can include a rectangular-shaped cross-section as shown in FIG. 4, although a variety of other cross-section shapes can be envisioned. For example, the arm(s) 425 can include a circular, elliptical, square, triangular, rectangular, trapezoidal, or other polygonal cross-section shape. In some embodiments, the arm(s) 425 can change cross-sectional shapes and/or dimensions along their length as measured between the dome 205 and the hub body 405. The arm(s) 425 can include faceted surfaces along the length of the arm(s) 425 as well as at locations where the arm(s) 425 attach to the dome 205 and/or the hub body 405. The faceted surfaces can reduce friction and improve flow of the fluid across the valve plug 200.

The dome 205 can include a first surface 430 and a second, opposing surface 435. The first surface 430 and the second surface 435 can be coupled by a side wall 440 extending around a circumference of the dome 205. The first surface 430 of the dome 205 can include a convex shape configured to evenly distribute a fluid flow across the surface 430. In some embodiments, the surface 430 can include a coating or a material layer atop the first surface 430. The coating or material layer can be selected to provide wear resistance. In some embodiments, the coating or material layer can include a metal alloy. In some embodiments, the coating can be a cobalt-chromium alloy. In some embodiments, the coating can include nickel or molybdenum as well as cobalt and/or chromium. The second surface 435 can be substantially flat. The side wall 440 can include a uniform height or can include portions that have different heights, as shown in FIG. 4. The height of the side wall 440 can be measured as a distance between the first surface 430 and the second surface 435. In some embodiments, the side wall 440 can include adjacent, concentric side wall portions extending around the circumference of the dome 205 that the same heights or different heights. In some embodiments, the side wall 440 can include a first portion having a first height at a first location, a second portion having a second height at a second location, and a tapered or sloped portion at a third location having a height that varies along the circumference of the side wall corresponding to the third location. In some embodiments, the side wall 440 can include two or more concentric side walls positioned adjacent to one another and between the first surface 430 and the second surface 435. A variety of non-limiting configurations of the side wall 440 can be envisioned.

Figure 5A:
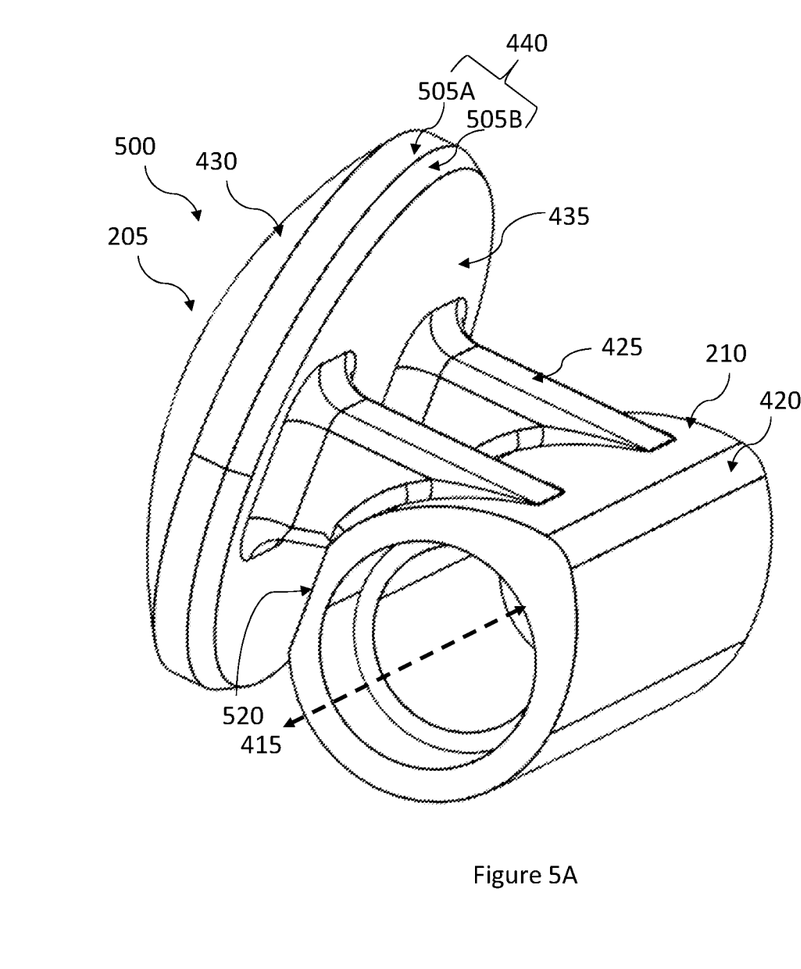
FIG. 5A is a perspective view of another embodiment of a valve plug according to subject matter described herein.
Figure 5B:
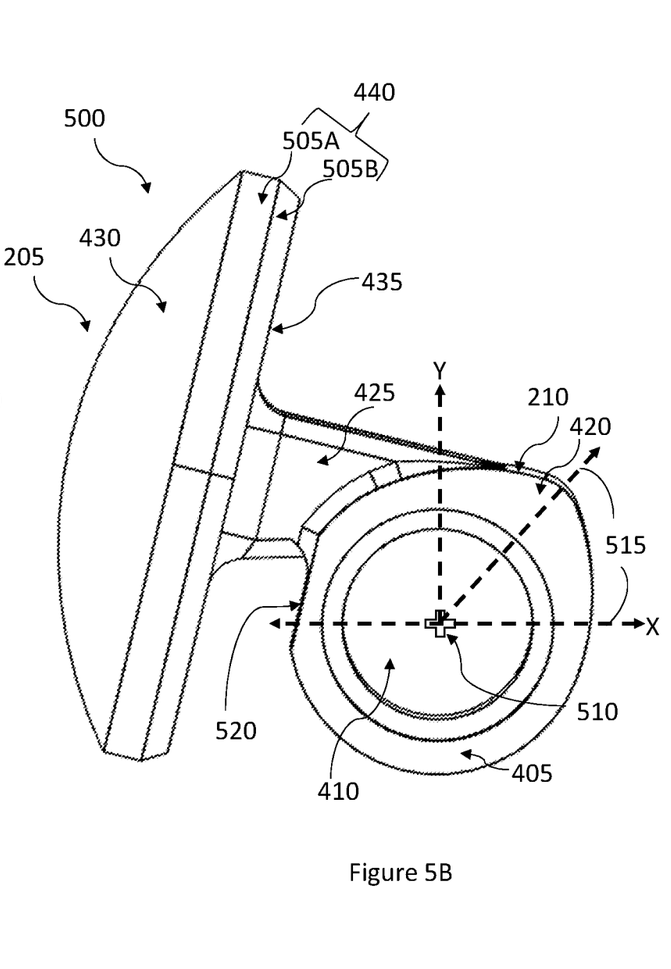
FIG. 5B is a cross-sectional view of the embodiment of FIG. 5A according to subject matter described herein.

In one embodiment, a valve plug 500 can include a side wall 440 with a consistent, uniform height around a circumference of the dome 205 as shown in FIGS. 5A and 5B. As shown in FIG. 5A, the valve plug 500 can include a side wall 440 formed from a plurality of side wall portions 505, such as 505A and 505B. The side wall portions 505 can include tapered and non-tapered portions. For example, as shown in FIG. 5A, the first side wall portion 505A can be substantially flat in cross-section, while the second side wall 505B can be tapered or at an angle with respect to the second surface 435 and/or the first side wall portion 505A. In some embodiments, neither side wall portion 505 may be tapered. In some embodiments, one or more side wall portions 505 can be tapered relative to the second surface 435.

As shown in FIG. 5B, in one embodiment, the valve plug 500 can include a single elliptically-shaped protrusion 420 and a flat, planar surface 520 integrally formed within the hub body 405. The single elliptically-shaped protrusion 420 can be directly opposite a cylindrical-shaped surface of the hub body 405. The elliptically-shaped protrusion 420 can be formed within the surface of the hub body 405 at an angle 515 relative to a horizontal (X) axis and a vertical axis (Y) extending through a central axis 510 of the bore 410 of the hub body 405. In some embodiments, the angle 515 can be 60 degrees from the X axis. In some embodiments, the angle 515 can be any angle between 0 and 90 degrees from the X axis. For example, the angle 515 can be 0-5, 5-10, 10-15, 15-20, 20-25, 25-30, 30-35, 35-40, 40-45, 45-50, 50-55, 55-60, 60-65-70, 70-75, 75-80, 80-85, or 85-90 degrees from the X axis. The flat surface 520 can be positioned adjacent to the arm 425 on the surface of the hub body 405. The flat surface 520 can be bisected or intersected by the horizontal plane X extending through a central axis 510 of the bore 410.

Figures 6A, 6B:
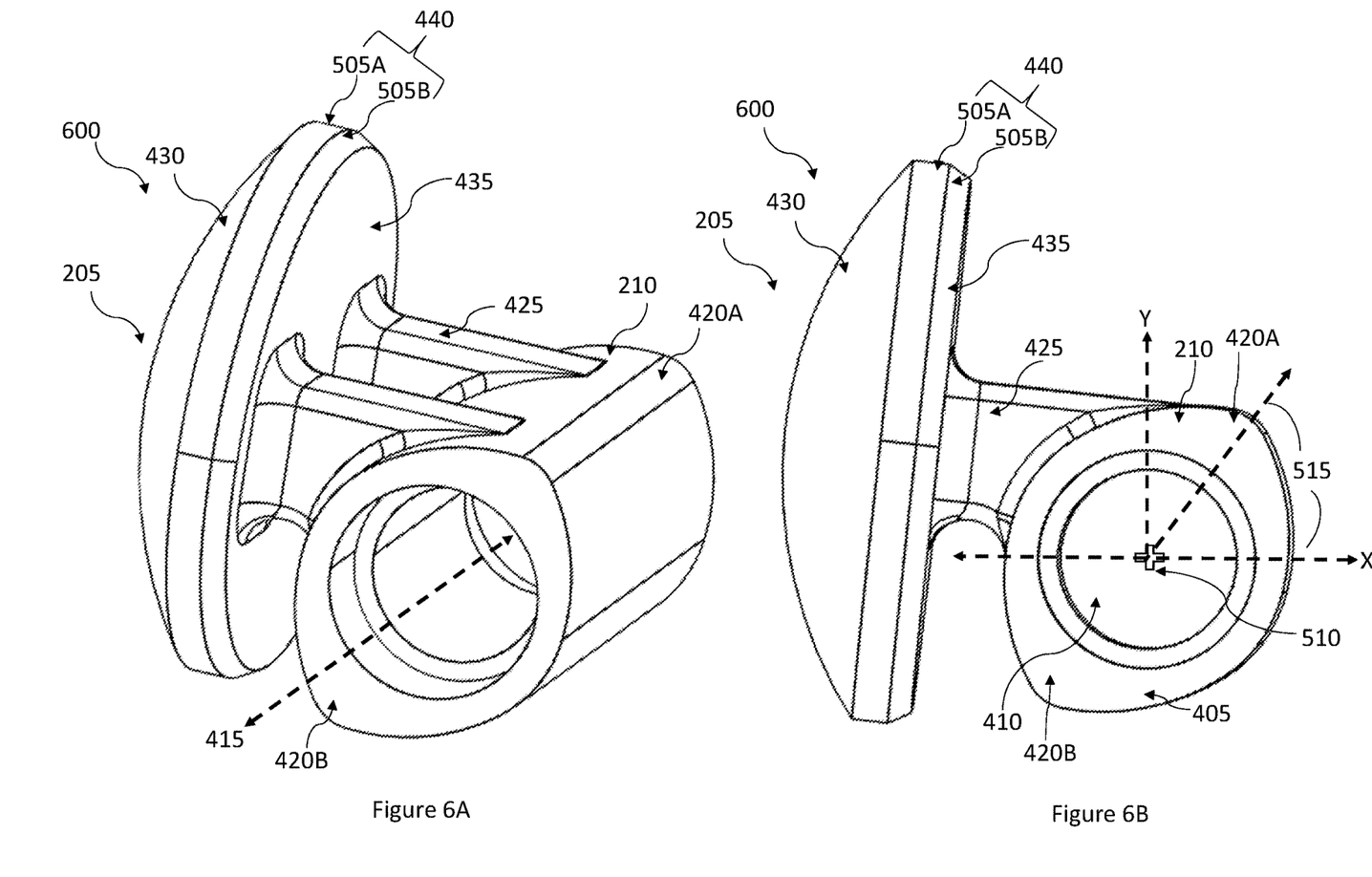
FIG. 6A is a perspective view of another embodiment of a valve plug according to subject matter described herein.
FIG. 6B is a cross-sectional view of the embodiment of FIG. 6A according to subject matter described herein.

In another embodiment, the valve plug 600 can include two elliptically-shaped protrusions 420, such as protrusions 420A and 420B shown in FIGS. 6A and 6B. As shown in FIGS. 6A and 6B, the protrusions 420A and 420B can be located on opposite sides of the hub body 405. The first elliptically-shaped protrusion 420A can be formed within the surface of the hub body 405 at an angle 515 relative to a horizontal (X) axis and a vertical axis (Y) extending through a central axis 510 of the bore 410 of the hub body 405. In some embodiments, the angle 515 can be 60 degrees from the X axis. In some embodiments, the angle 515 can be any angle between 0 and 90 degrees from the X axis. For example, the angle 515 can be 0-5, 5-10, 10-15, 15-20-25, 25-30, 30-35, 35-40, 40-45, 45-50, 50-55, 55-60, 60-65, 65-70, 70-75, 75-80, 80-85, or 85-90 degrees from the X axis. The second elliptically-shaped protrusion 420B can be located 180 degrees from the first elliptically-shaped protrusion 420A. In the embodiment shown in FIGS. 6A and 6B, the valve plug 600 can include a dome 205 having a similar side wall 440 as that shown in the embodiment of FIGS. 5A and 5B.

Figure 7A:
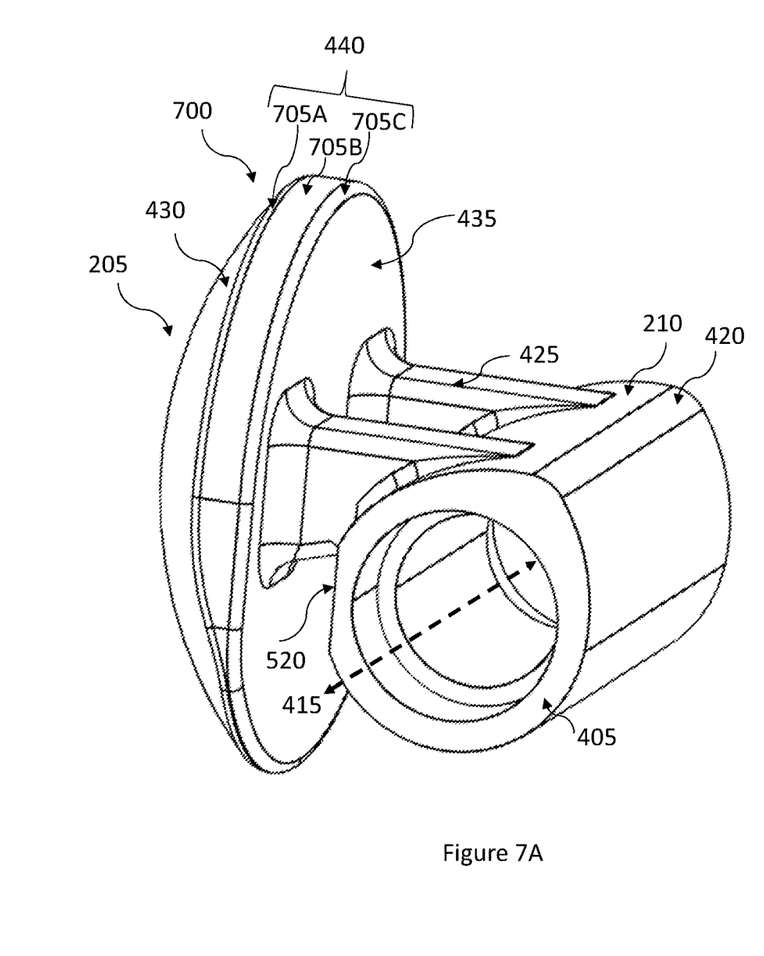
FIG. 7A is a perspective view of another embodiment of a valve plug according to subject matter described herein.

In another embodiment, the valve plug 700 can include a single elliptically-shaped protrusion 420, a planar surface 520, and a side wall 440 with a plurality of side wall heights and a tapered side wall portion. The hub body 405 of the embodiment of the valve plug 700 shown in FIGS. 7A and 7B can correspond to the configuration of the hub body 405 shown and described in relation to FIGS. 5A and 5B. The side wall 440 can include a plurality of side wall portions, such as side wall portions 705A, 705B, and 705C. In some embodiments, the side wall portions 705 can have different heights and profiles or the same heights and profiles as measured relative to the first surface 430 or the second surface 435. For example, side wall portion 705A and 705C can be tapered relative to the first surface 430 and the second surface 435, respectively. Side wall portion 705B can be substantially flat and may not be tapered.

Figure 7B:
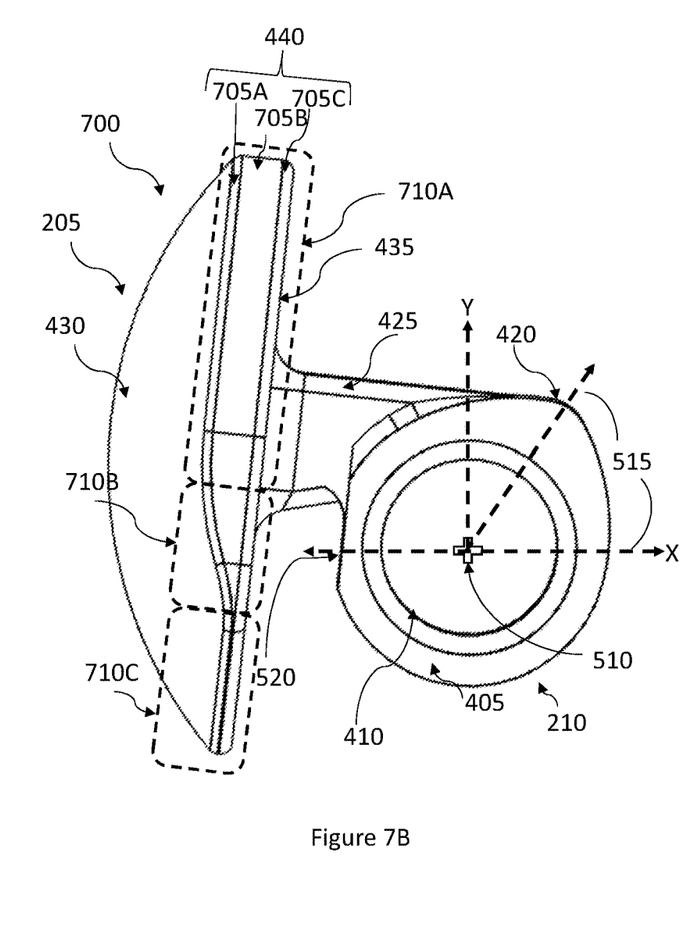
FIG. 7B is a cross-sectional view of the embodiment of FIG. 7A according to subject matter described herein.

As further shown in FIG. 7B, the side wall 440 can vary in height at one or more regions 710 around the circumference of the dome 205. For example, as shown by dashed-line boxes in FIG. 7B, the valve plug 700 can include three regions 710, each of which have a different height and/or slope as measured relative to the second surface 435. A first region 710A can include side wall portions 705A-705C, each of which having a consistent height within the first region 710A. A second region 710B can include side wall portions 705A and 705C having a consistent height and can further include side wall portion 710B to have a sloped or variable height within the second region 710B. A third region 710C can include side wall portions 705A-705C, each of which having a consistent height within the third region 710C. A variety of configurations of side wall 440 heights (e.g., including side wall portions 505 or 705) as well as a number, a location, or an arrangement of the side wall regions 710 (e.g., side wall regions 710A-710C) can be envisioned without limit. The configuration of the height of the side wall 440 and the length or number or the location of the side wall regions 710 on the circumference of the dome 205 can be provide to enhance flow coefficients (Cv) of the valve 110 during opening and closing operations by provide a stream-lined, low-friction interface with the flow of fluid passing through the valve 110.

Figure 8A:
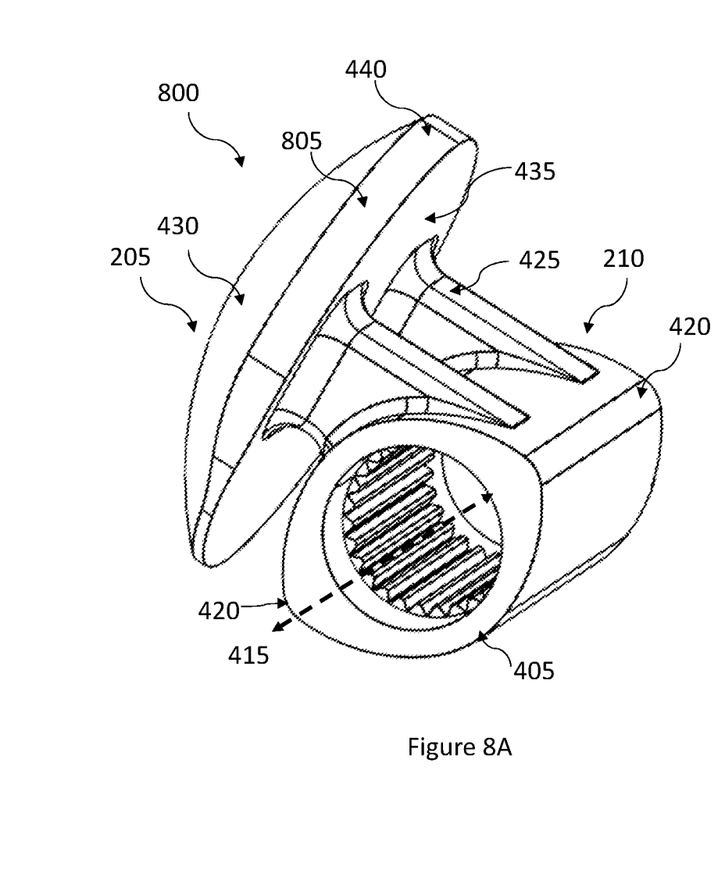
FIG. 8A is a perspective view of another embodiment of a valve plug according to subject matter described herein.
Figure 8B:
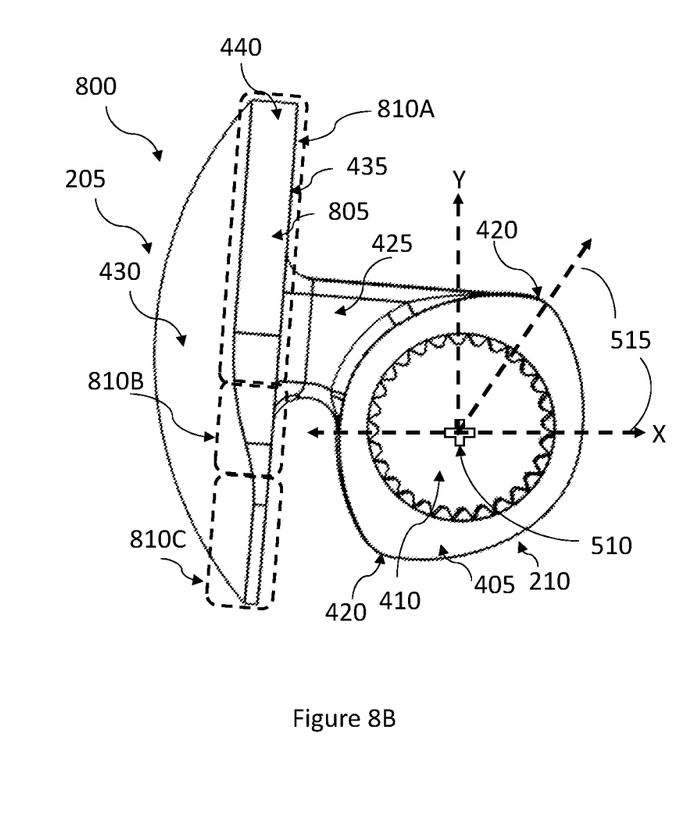
FIG. 8B is a cross-sectional view of the embodiment of FIG. 8A according to subject matter described herein.

In another embodiment, the valve plug 800 can include two elliptically-shaped protrusions 420 formed within the hub body 405 and corresponding to the configuration described in relation to FIGS. 6A and 6B. The valve plug 800 as shown in FIGS. 8A and 8B can also include a side wall 440 consisting of a single side wall portion 805 that can extend about the circumference of the dome 205 through three side wall regions 810. The height of the side wall 440 can vary in each of the side wall regions 810 as shown by dashed-line boxes in FIG. 8B. For example, in a first side wall region 810A, the side wall 440 can have a first height and in a third side wall region 810C, the side wall 440 can have a second height less than the first height of the side wall 440 in the first region 810A. The side wall 440 can further include a sloped or varying height within a second side wall region 810B. A variety of configurations of side wall 440 heights (e.g., including side wall portion 805) as well as a number, a location, or an arrangement of the side wall regions 810 (e.g., side wall regions 810A-810C) can be envisioned without limit. The configuration of the height of the side wall 440 and the length or the number or the location of side wall regions 810 on the circumference of the dome 205 can be provide to enhance flow coefficients (Cv) of the valve 110 during opening and closing operations by provide a stream-lined, low-friction interface with the flow of fluid passing through the valve 110.

Figure 9:
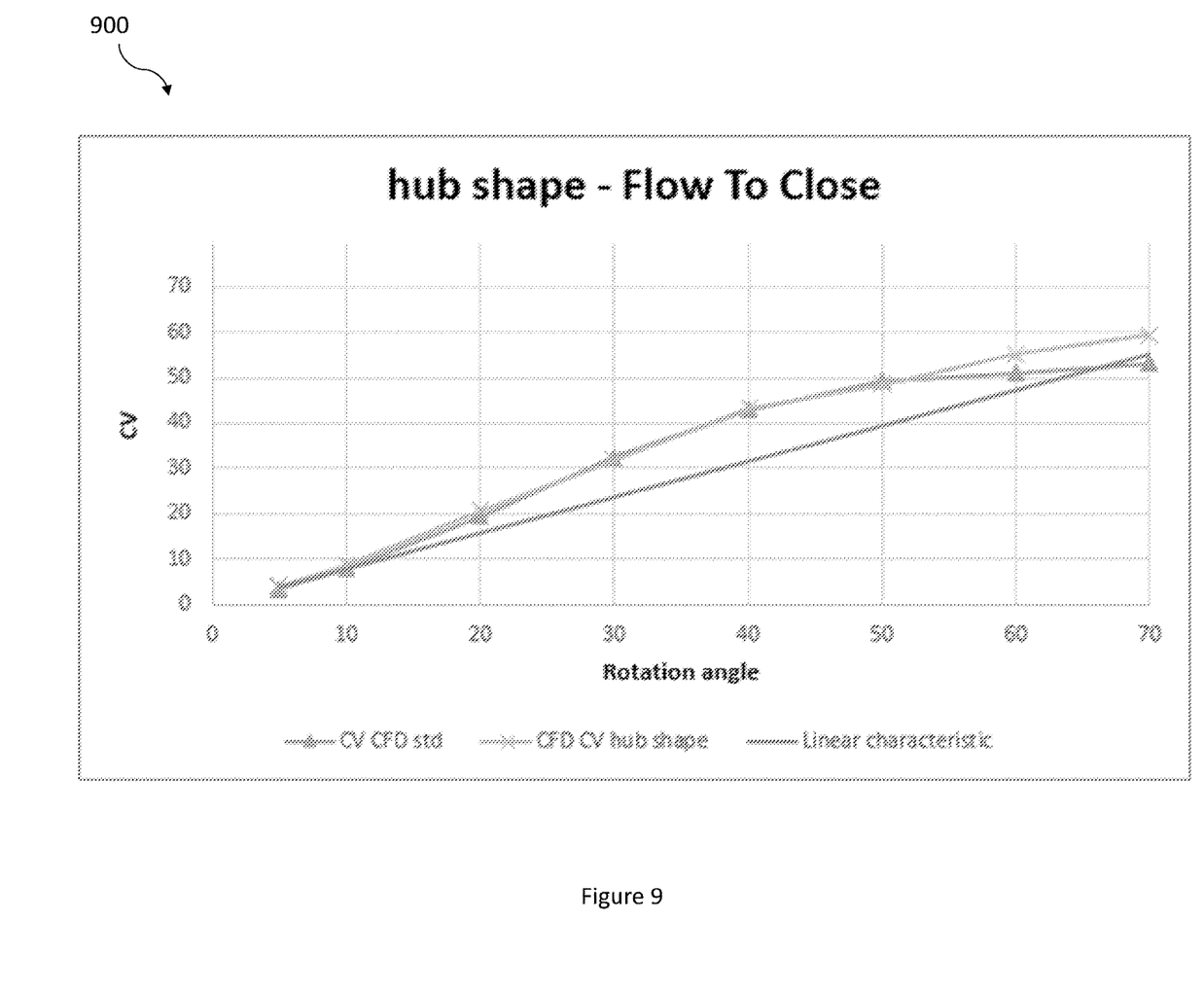
FIG. 9 is a plot illustrating an improved flow coefficient of a valve including an embodiment of the valve plug configured with an elliptically-shaped hub body as described herein.

As shown in FIG. 9, the plot 900 illustrates the fluid coefficient (Cv) of a valve 110 configured with a valve plug 200 as described herein for a range of rotation angles associated with the flow path 300. The plot 900 illustrates Cv values for the valve 110 configured with an embodiment including the elliptically-shaped hub body 405 (denoted "CFD CV hub shape" in the legend) with respect to Cv valves for a traditional valve plug (denoted "CV CFD std" in the legend). The embodiment of the valve plug 200 including the elliptically-shaped hub body 405 corresponds to the embodiment shown in FIG. 4. As shown in plot 900, the valve plug 200 configured with the elliptically-shaped hub body 405 demonstrates improved Cv at rotation angles above 50 degrees compared to the traditional valve plug. The Cv improvements are significant in that the Cv of a traditional valve plug plateaus relatively at a rotation angle of about 50 degrees and remains approximately constant as traditional valve plug is rotated through rotation angles between 50 and 70 degrees with only minimal Cv gains in that range. In contrast, the improved valve plug 200 including the elliptically-shaped hub body 405 demonstrates greater, more linear improvements in Cv as the valve plug with the elliptically-shaped hub body 405 is rotated through rotation angles above 50 degrees, as shown by the plot line corresponding to Cv values associated with the embodiment of the elliptically-shaped hub body 405 (denoted as "CFD CV hub shape" in the legend).

Figure 10:
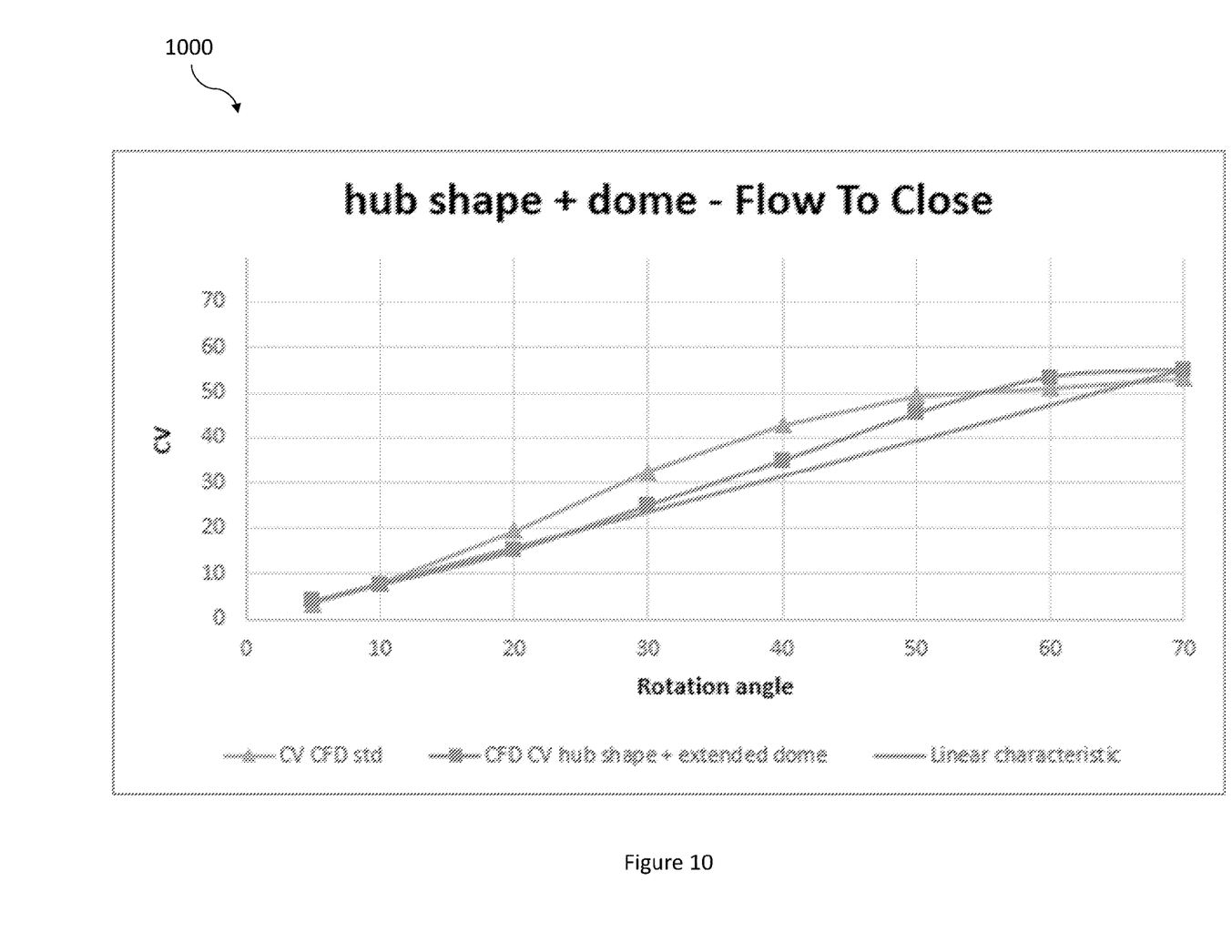
FIG. 10 is a plot illustrating an improved flow coefficient of a valve including an embodiment of the valve plug configured with an elliptically-shaped hub body and an extended dome as described herein.

As shown in FIG. 10, the plot 1000 illustrates the fluid coefficient (Cv) of a valve 110 configured with a valve plug 200 as described herein for a range of rotation angles associated with the flow path 300. The plot 1000 illustrates Cv values for the valve 110 configured with an embodiment of the valve plug 200 including an elliptically-shaped hub body 405 and an extended dome 205 (denoted as "CFD CV hub shape+extended dome" in the legend) with respect to Cv valves for a traditional valve plug (denoted "CV CFD std" in the legend). The embodiment of the valve plug 200 including the elliptically-shaped hub body 405 and the extended dome 205 corresponds to the embodiment shown in FIG. 4. As shown in plot 1000, the valve plug 200 configured with the elliptically-shaped hub body 405 and the extended dome 205 demonstrates improved Cv at rotation angles above 55 degrees compared to traditional valve plugs. The Cv improvements are significant in that the Cv of a traditional valve plug plateaus at a rotation angle of about 50 degrees and remains relatively constant as the traditional valve plug is rotated through rotation angles between 50 and 70 degrees with minimal Cv gains in that range. In contrast, the improved valve plug 200 including the elliptically-shaped hub body 405 and the extended dome 205 demonstrates linear improvements in Cv for rotation angles above 55 degrees, as shown by the plot line corresponding to Cv values associated with the embodiment of the elliptically-shaped hub body 405 and the extended dome 205 (denoted as "CFD CV hub shape+extended dome" in the legend).

Exemplary technical effects of the apparatuses and systems including a valve plug as described herein include, by way of non-limiting example, improved flow coefficients and improved flow capacity of valves during opening and closing of the valve. Turbulence of the fluid flowing through the valve can be reduced by the elliptical-shaped protrusions integrated into the body of the valve plug. The dome of the valve plug can improved flow control at low opening compared to existing valve plugs. As a result, the valve can be more precisely controlled during opening and closing operations.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A valve plug, comprising:
    a hub comprising
        a hub body having a longitudinal axis extending through the hub body and a bore extending along the longitudinal axis extending through the hub body, and
        at least one elliptically-shaped protrusion integrally formed with the hub body;
    a dome having a first surface, a second surface opposite the first surface, and at least one side wall extending between the first surface and the second surface around a circumference of the dome; and
    at least one arm extending between the hub body and the second surface of the dome.

2. The valve plug of claim 1, wherein the hub comprises two arms extending between the hub body and the second surface of the dome.

3. The valve plug of claim 1, wherein the bore includes a plurality of grooves configured to receive a splined drive shaft.

4. The valve plug of claim 1, wherein the at least on elliptically-shaped protrusion extends radially away from the longitudinal axis.

5. The valve plug of claim 1, wherein the at least one elliptically-shaped protrusion is positioned at an angle relative to a horizontal plane intersecting the longitudinal axis of the hub body.

6. The valve plug of claim 5, wherein the hub body further comprises a substantially flat portion at a circumferential location of the hub body bisected by the horizontal plane.

7. The valve plug of claim 1, wherein the at least one elliptically-shaped protrusion comprises a first elliptically-shaped protrusion and a second elliptically-shaped protrusion opposite the first elliptically-shaped protrusion.

8. The valve plug of claim 1, wherein the at least one side wall comprises a first side wall having a first height, a second side wall having a second height different than the first height of the first side wall, and a tapered side wall between the first side wall and the second side wall.

9. The valve plug of claim 8, wherein the at least one side wall further comprises a third side wall having a third height and a fourth sidewall extending at an angle from the second surface of the dome.

10. The valve plug of claim 1, wherein the dome further comprises a material atop the first surface configured to provide wear resistance.

11. The valve plug of claim 10, wherein the overlay material is a cobalt alloy.

12. The valve plug of claim 1, wherein the valve plug is included in a rotary valve.

13. The valve plug of claim 12, wherein the rotary valve is operable to control flow of a fluid through the rotary valve in a first direction and in a second direction opposite to the first direction.

14. The valve plug of claim 12, wherein a cross-sectional shape of the hub is configured to increase a flow coefficient of the rotary valve and to maintain pressure of the fluid adjacent to the hub body.

15. The valve plug of claim 1, wherein the first surface has a substantially convex shape and the second surface is substantially flat.

16. The valve plug of claim 1, wherein the at least one arm has a substantially rectangular-shaped cross section.

17. A system comprising:
    a controller including an actuator coupled to a drive shaft; and
    a valve coupled to the drive shaft and including a first opening, a second opening opposite the first opening, and a valve plug positioned between the first opening and the second opening, the valve plug comprising
        a hub coupled to the drive shaft, the hub comprising
            a hub body having a longitudinal axis extending through the hub body and a bore extending along the longitudinal axis through the hub body, and
            at least one elliptically-shaped protrusion integrally formed with the hub body;
        a dome having a first surface, a second surface opposite the first surface, and at least one side wall extending between the first surface and the second surface around a circumference of the dome; and
        at least one arm extending between the hub body and the second surface of the dome.

18. The system of claim 17, wherein the valve is operable to control flow of a fluid through the valve in a first direction and in a second direction opposite to the first direction.

19. The system of claim 17, wherein the first opening or the second opening includes a valve seat configured to engage with the at least one side wall of the dome and cause the valve to be fluidically sealed.

20. The system of claim 19, wherein the valve seat includes a wear resistant material.

* * * * *